Figure 1:
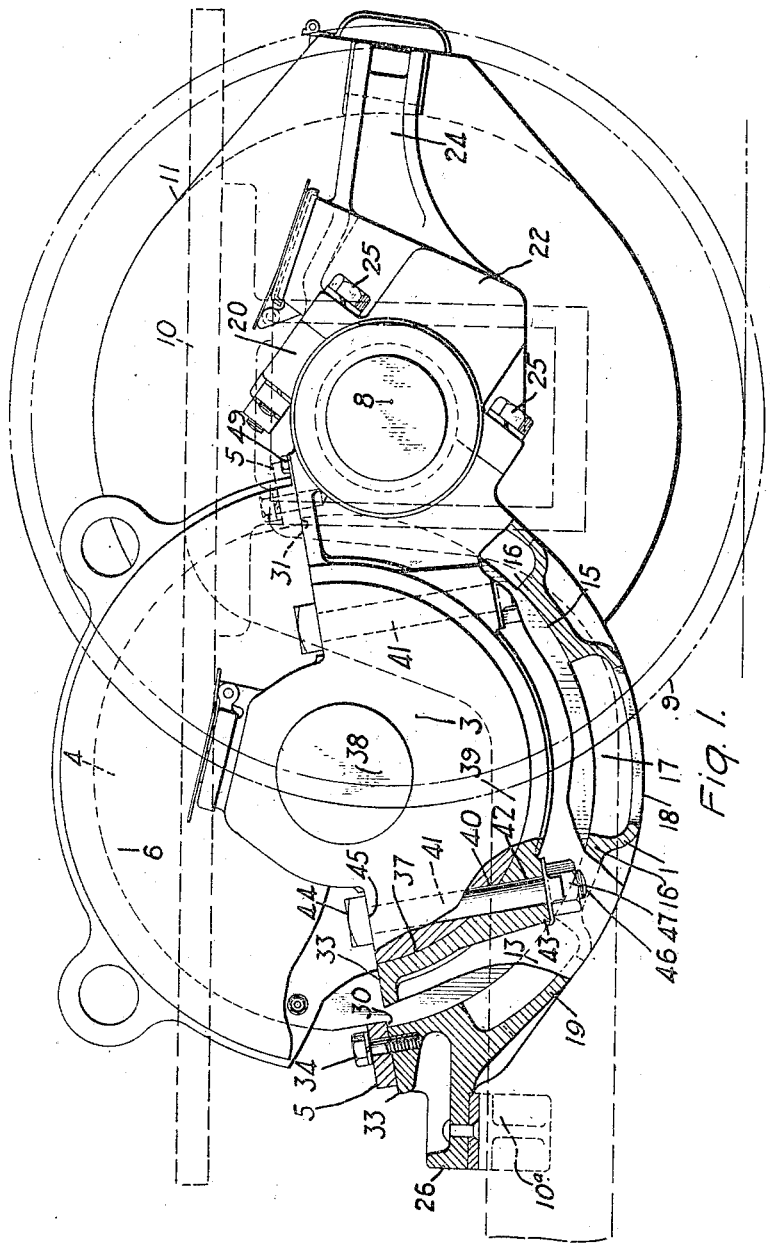

J. V. DOBSON.
DYNAMO ELECTRIC MACHINE.
APPLICATION FILED JULY 22, 1915.

1,256,212.

Patented Feb. 12, 1918.
2 SHEETS—SHEET 1.

WITNESSES:

INVENTOR
John V. Dobson.
BY
ATTORNEY

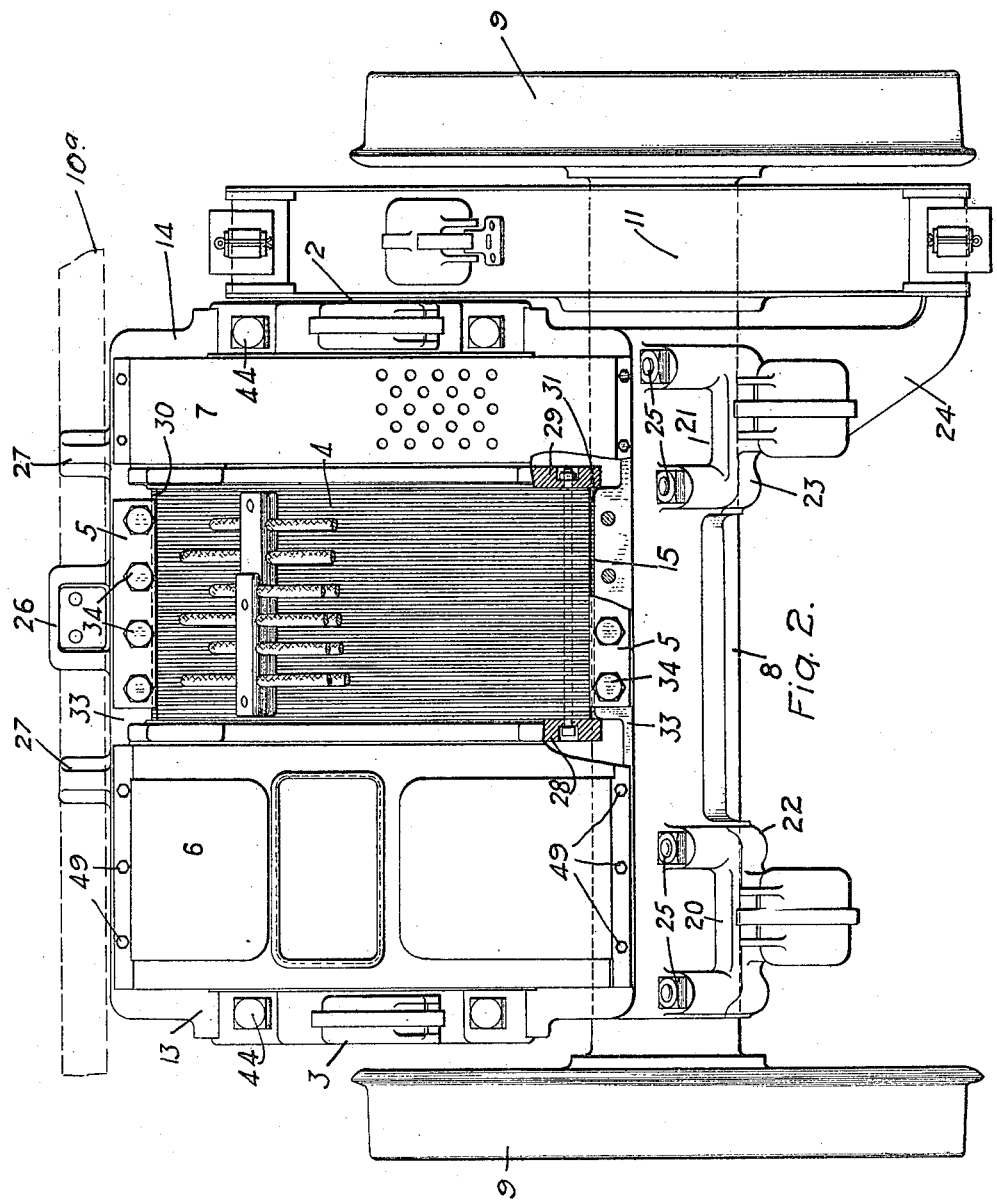

UNITED STATES PATENT OFFICE.

JOHN V. DOBSON, OF WILKINSBURG, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,256,212.  Specification of Letters Patent.  Patented Feb. 12, 1918.

Application filed July 22, 1915. Serial No. 41,260.

*To all whom it may concern:*

Be it known that I, JOHN V. DOBSON, a citizen of the United States, and a resident of Wilkinsburg, in the county of Allegheny and State of Pennsylvania, have invented a new and useful Improvement in Dynamo-Electric Machines, of which the following is a specification.

My invention relates to dynamo-electric machines, and it has special reference to the construction of railway motors of the class that are adapted for suspension upon the driving axles of the cars or other vehicles upon which they are mounted.

One of the objects of my invention is to provide a machine of the above-indicated character which shall be simple, compact and durable in construction, which may be commercially manufactured and overhauled for repairs with facility and at relatively small expense, and which, moreover, shall materially decrease the weight and cost of such apparatus per unit of power by reason of the simplified and improved arrangement and location of parts.

Another object of my invention is to provide a relatively light-weight alternating-current motor which shall comprise merely a lower half-frame having integral axle brackets and nose projections and which is adapted to receive and support a unitary laminated core structure that is rigidly clamped in position and which also is provided with removable bearing housings that are seated in the end portions of the half-frame and serve to support the armature.

In the recent development of railway motors, every endeavor has been made to reduce the weight and cost per unit of power output, and particularly so with motors of the alternating-current type which are inherently relatively heavy and bulky. The motor frames have been lightened in every way consistent with requisite strength and rigidity, and the introduction of forced ventilation in the railway-motor art has contributed much in the way of materially reducing the weight and bulk of such machines. Furthermore, the recent introduction of the so-called "pressed-steel" motor, which embodies an inclosing frame formed of structural steel, has greatly contributed to the advancement of the art in this direction.

According to my present invention, I provide a motor of the usual electric-railway-car type, one end of which is supported, in the usual manner, upon one of the driving axles and the other end of which is carried by the truck frame upon nose projections. Moreover, I propose to provide a motor of surprisingly light weight in comparison with the horse-power output that it develops, and this I accomplish by merely employing a lower half-frame member into which the magnetizable core is seated and positioned. The half-frame is not required to carry any of the magnetic flux and its weight, therefore, is dependent upon the requirements of rigidity and strength for supporting the magnetizable member. The half-frame may be cast as usual or may be of structural steel, if desired. The core member is without a cover, no upper half-frame being employed, although the respective ends of the motor are protected by inclosing casings of sheet material.

In the accompanying drawings, Figure 1 is a view, partially in side elevation and partially in section, of a railway motor constructed in accordance with my invention, and Fig. 2 is a plan view of the apparatus shown in Fig. 1.

Referring to the drawings, the apparatus shown comprises a lower half-frame 1, a plurality of bearing housings 2 and 3, a magnetizable core 4, clamping members 5, inclosing end casings 6 and 7, an axle 8, wheels 9, a truck frame 10 and a gear case 11.

The half-frame 1, as shown, is substantially semi-cylindrical in form, although it is not essentially so, except in so far as this form lends itself to lightness and strength of construction. The half-frame 1, however, is provided substantially midway between its ends 13 and 14 with a semi-cylindrical seat 15 which preferably comprises a plurality of longitudinally disposed raised portions 16 upon which the magnetizable core 4 rests. The spaces 17 intermediate the several raised portions 16 that together constitute the cylindrical seat 15, are cored out and, moreover, are provided with ventilating openings 18 through which ventilating air may be conducted. A strengthening rib 19 constitutes a part of the half-frame and is associated with the nose projection 26.

One side of the half-frame 1 is provided with integral axle brackets 20 and 21 of well-known construction with which removable axle caps 22 and 23 respectively coöperate for the purpose of surrounding the driving axle 8 and supporting one side of the motor thereon, in accordance with customary practice. The axle cap 23 is also provided with a projecting arm 24 for suspending one end of the gear case 11. The axle caps 22 and 23 are positioned by bolts 25.

The other side of the half-frame 1 is provided with an integral nose projection 26 and a plurality of projections or stops 27 that are disposed on opposite sides of the nose projection 26. The nose projection 26 is adapted to rest upon a member 10ª that constitutes a part of the truck frame 10 which may be of any suitable construction, whereby the motor, as a whole, is supported and carried through the agency of the driving axle 8 and the truck frame 10 by means of the axle brackets 20 and 21 and nose projection 26 which form integral parts of the half-frame 1.

The magnetizable core 4 preferably comprises a unitary cylindrical structure composed of a plurality of laminations that are assembled in side-by-side relation between a pair of end-plates 28 and 29 and which are riveted or bolted together in a suitable manner. The seat 15 of the half-frame 1 and the periphery of the magnetizable core 4 are carefully machined so that the core is accurately positioned when lowered into place. The end plates 28 and 29 are slightly larger in diameter than the laminations and, therefore, project slightly beyond the sides of the seat 15 and tend to prevent longitudinal displacement of the core.

The magnetizable core 4, as a unit, is provided at diametrically opposite points with shoulders 30 and 31 which are located with respect to the upper surfaces 33 of the sides of the half-frame 1 so that the core 4 may be rigidly clamped in position by means of the clamping members 5 and coöperating bolts 34 which project through said members and into the frame. The clamping members 5 project inwardly beyond the sides of the frame and engage the shoulders 30 and 31, as will be understood.

In its broadest aspect, my invention is not restricted to the particular means of positioning the core, as any suitable clamping means for this purpose may be employed—for instance, a plurality of semi-circular straps which surround the upper half of the core and are fastened to the half-frame.

The end portions 13 and 14 of the half-frame 1 are provided with semi-circular openings or seats 37 in which the respective bearing housings 2 and 3 are disposed for the purpose of carrying the armature shaft 38. The bearing housings 2 and 3 are of any well-known and suitable construction, so far as their oiling function is concerned, and each comprises a semi-circular body portion 39 which rests in the circular seat 37 and is provided with openings 40 at its ends for the reception of through-bolts 41 which project therethrough and through registering openings 42 that are provided in integral lugs 43 which constitute parts of the half-frame 1. The heads 44 of the bolts 41 rest against the upper surface 45 of the body portion 39, and the other ends 46 of said bolts are threaded and are fitted with nuts 47, whereby the bearing housings may be rigidly clamped in position.

For the purpose of inclosing the ends of the machine, the casings 6 and 7 are provided, said casings being preferably of light sheet material that may conveniently be perforated to permit of ventilation. The several casings are so fashioned as to engage the respective end plates 28 and 29 and to rest upon the upper surfaces of the half-frame 1 to which they are secured by bolts 49 or other suitable means.

Thus, it is seen that unnecessary material has been reduced to a minimum, and, as a result, the weight of the structure is greatly reduced over the ordinary forms of construction of railway motors that have been employed in the past.

It will also be noted that the plane of the upper surface of the half-frame 1 passes through the center of the armature shaft and that both the nose projection 26 and the integral bearing brackets 20 and 21 are located substantially below this plane. By reason of this arrangement of parts, the cost of commercial manufacture is relatively cheap, inasmuch as, after planing or finishing the upper surfaces of two similar half-frames they may be placed and clamped one against the other, and a single milling operation may be utilized for finishing the semi-cylindrical seats 15 and 37 of both members.

The appended claims are intended to cover such modifications in the structural details and arrangement of parts as do not depart from the spirit and scope of my invention.

I claim as my invention:

1. A railway motor adapted to be suspended from a driving axle and comprising a stationary cylindrical laminated core, a lower half-frame having a semi-cylindrical seat for supporting said core, said half-frame being provided with an integral axle bracket on one side and an integral nose projection on the opposite side for supporting the motor, means for positioning the core rigidly in said frame, and inclosing casings of sheet material associated with the core and the respective ends of said half-frame.

2. A railway motor adapted to be suspended from a driving axle and comprising an uncovered stationary cylindrical laminated core having longitudinal side recesses therein, a lower half-frame having a semi-cylindrical seat for supporting said core and also provided with integral axle brackets and a nose projection disposed on opposite sides thereof for suspending said motor, clamping members disposed in said recesses and resting upon the sides of said half-frame, bolts coöperating with said members for rigidly positioning said core, and inclosing casings of sheet material for covering the end spaces between the uncovered core and the ends of the supporting half-frame.

3. A railway motor adapted to be suspended upon a driving axle and comprising a lower half-frame having a semi-cylindrical seat and provided with integral axle brackets and nose projections upon opposite sides thereof for suspending said motor, a cylindrical laminated core seated in said half-frame and having longitudinal side recesses therein, and clamping means coöperating with said recessed core and the sides of said half-frame for rigidly positioning said core.

4. A railway motor adapted to be suspended upon a driving axle and comprising a lower half-frame having a semi-cylindrical seat and semi-cylindrical end openings, said frame having integral axle brackets and a nose projection on opposite sides thereof, a cylindrical laminated core disposed in said semi-cylindrical seat and rigidly secured to said half-frame, a plurality of bearing housings resting in said end semi-cylindrical openings, and a plurality of through-bolts coöperating with said housings and said frame for securing said housings in position.

5. A railway motor adapted to be suspended from a driving axle and comprising a lower half-frame having a semi-cylindrical seat therein, an axle bracket and a nose projection integrally associated with the respective sides of said frame and located substantially below the upper surface of said half-frame, and an uncovered cylindrical core adapted to rest in said seat and to be rigidly secured to said frame.

6. An electric motor comprising a half-frame having a semi-cylindrical core seat, a cylindrical laminated core seated in said frame, and means for securing said core in place.

7. An electric motor comprising a half-frame having a semi-cylindrical core seat, a cylindrical core seated in said half-frame and having longitudinal side grooves, and clamping strips engaging said grooves and secured to said frame for positioning said core.

8. An electric motor comprising a lower half-frame having a semi-cylindrical seat, a substantially cylindrical core positioned within said seat, and means for securing said core in place.

In testimony whereof I have hereunto subscribed my name this 19th day of July, 1915.

JOHN V. DOBSON.